US011016825B2

(12) United States Patent
Anand et al.

(10) Patent No.: US 11,016,825 B2
(45) Date of Patent: May 25, 2021

(54) FLEXIBLE ANALYTICS FRAMEWORK SELECTION (71) Applicant: VMware, Inc., Palo Alto, CA (US)

(72) Inventors: Ankit Anand, Tempe, AZ (US); Matthew Donald Miller, Decatur, GA (US); Raghu Mummadi, Alpharetta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/247,206

(22) Filed: Jan. 14, 2019

(65) Prior Publication Data
US 2020/0226004 A1 Jul. 16, 2020

(51) Int. Cl.
*G06F 9/54* (2006.01)
*G06F 8/75* (2018.01)
(52) U.S. Cl.
CPC ............ *G06F 9/542* (2013.01); *G06F 8/75* (2013.01)
(58) Field of Classification Search
None
See application file for complete search history.

(56) References Cited

U.S. PATENT DOCUMENTS

| | | | |
|---|---|---|---|
| 2014/0366041 A1* | 12/2014 | Stanley-Marbell | G06F 9/4825 719/318 |
| 2015/0381578 A1* | 12/2015 | Thota | H04L 63/0428 713/168 |
| 2019/0102244 A1* | 4/2019 | Tarlano | G06N 5/022 |

* cited by examiner

Primary Examiner — Craig C Dorais
(74) Attorney, Agent, or Firm — Thomas Horstemeyer, LLP (57) ABSTRACT The flexible selection among analytics providers is described. In one example, an application is developed for use with a number of different analytics providers. After the application is developed, one or more of the analytics providers can be easily selected based on a constant defined in an analytics framework of the application. During execution of the application, the application can identify the selected analytics provider based on the predetermined constant in the analytics framework. When an event is triggered at a certain occasion or step during the process, the analytics framework can route the event to an event agent for the selected analytics provider. Further, the event agent can perform an event report call based on the event, where the event report call is tailored for the interface of the selected analytics provider by the event agent. The analytics provider can be easily changed by updating the predetermined constant.

20 Claims, 4 Drawing Sheets

FLEXIBLE ANALYTICS FRAMEWORK SELECTION

BACKGROUND

Application development is the process of creating computer programs to perform various tasks for mobile, desktop, server, and other platforms. Applications help individuals and businesses automate certain tasks and increase efficiency. User interface (UI) design, particularly for applications used on mobile devices, is an important aspect of application development. UI design encompasses a number of considerations, such available input/output interfaces, device form factors, hardware and connectivity constraints, and other considerations. The manner in which users interface with devices is a key focus of UI design. To some extent, UI design for mobile devices includes additional constraints based on the form factors of mobile devices, the input devices available for mobile devices, the screen sizes of mobile devices, and other factors. In view of these factors, among others, one goal in UI design is to provide a user-friendly interface through which users can efficiently and effectively perform certain tasks and increase efficiency.

Application analytics refers to the real-time collection, analysis, and visualization of data related to the use of various applications. Among other uses, application analytics can be relied upon to provide insights into how users experience and interface with applications on various platforms, to troubleshoot application interfaces, and to identify where developers should focus further development activities. Application analytics empower software developers and IT managers to more quickly answer questions and solve problems.

As examples, application analytics can be relied upon to identify which features of an application are the most and the least commonly used by users. Application analytics can also be used to identify the paths users take to navigate through menus or interfaces in applications and the length of time it takes users to navigate through the menus and complete tasks. Application analytics can also be used to help identify interfaces that are troublesome, confusing, or problematic for users. With the feedback gathered from these analytics, developers can gain valuable insights and improve applications.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

As noted above, application analytics refers to the real-time collection, analysis, and visualization of data related to the use of various applications. Application analytics can be relied upon to provide insights into how users experience and interface with applications on various platforms, to troubleshoot application interfaces, and to identify where developers should focus further development activities. Today, application developers can choose to work with a number of different analytics providers, each of which may offer a different solution for analytics collection and visualization. The number of analytics providers can be expected to change in the future, as service providers come and go over time.

Because analytics providers offer different solutions, developers may have a difficult time selecting one analytics provider verses another. Also, once an application is tailored to incorporate the associated code instances, classes, and libraries associated with a particular analytics provider, it can be relatively difficult and time consuming to modify the application for use with a different analytics provider. Thus, it would be helpful to have a scalable, provider-independent solution to handle analytics events in applications.

In the context outlined above, a flexible, scalable, provider-independent solution for the selection of an analytics provider for an application is described. After the application is developed, one or more analytics providers can be easily selected for gathering analytics data. The analytics provider can be selected based on a provider type constant defined in an analytics framework of the application. Regardless of which analytics providers is selected, a generic event reporting instance can be used with any of the analytics providers. The event reporting instance can be designed to operate using a single, common set of events and event names regardless of the analytics provider selected. A number of different event agents can also be incorporated into the analytics framework, each tailored for use with a different analytics provider.

Events can be triggered at different points or occasions in the process flow of the application for gathering analytics data during execution of the application. Each event can be reported using the generic event reporting instance when triggered, and the generic event reporting instance can report analytics data associated with the event.

An analytics framework in the application can then route the event to one of the event agents based on the selected analytics provider according to the provider type constant defined in the analytics framework. In turn, the event agent can perform an event report call to the selected analytics provider interface based on the event. The event report call can be tailored for the interface of the selected analytics provider by the event agent. Through the flexibility achieved by this technical approach, the analytics provider can be easily changed by updating the provider type constant, but it is not necessary to change the generic event reporting instance.

The analytics framework selection approach described herein provides a number of technical advantages. For example, it is not necessary for developers to select one analytics provider before or during the development of an application. Instead, the application can be developed without any need to tailor code for a particular analytics provider, and the analytics provider can be selected and changed any number of times even after the application is developed. The analytics provider can be changed through a simple edit to a constant in the analytics framework, such as through an edit to a compile-time or runtime constant.

The analytics framework can be directly added to an application. Alternatively, the analytics framework can be incorporated into the application through a body of pre-written code, classes, procedures, scripts, configuration data, and other elements in a software library for additional flexibility. When incorporating the analytics framework using a library, maven control can be relied upon to update the analytics framework, push updates, and even permit the selection of new analytics providers over time without the need to update the individual applications that incorporate the library as an additional technical advantage.

Figure 1:
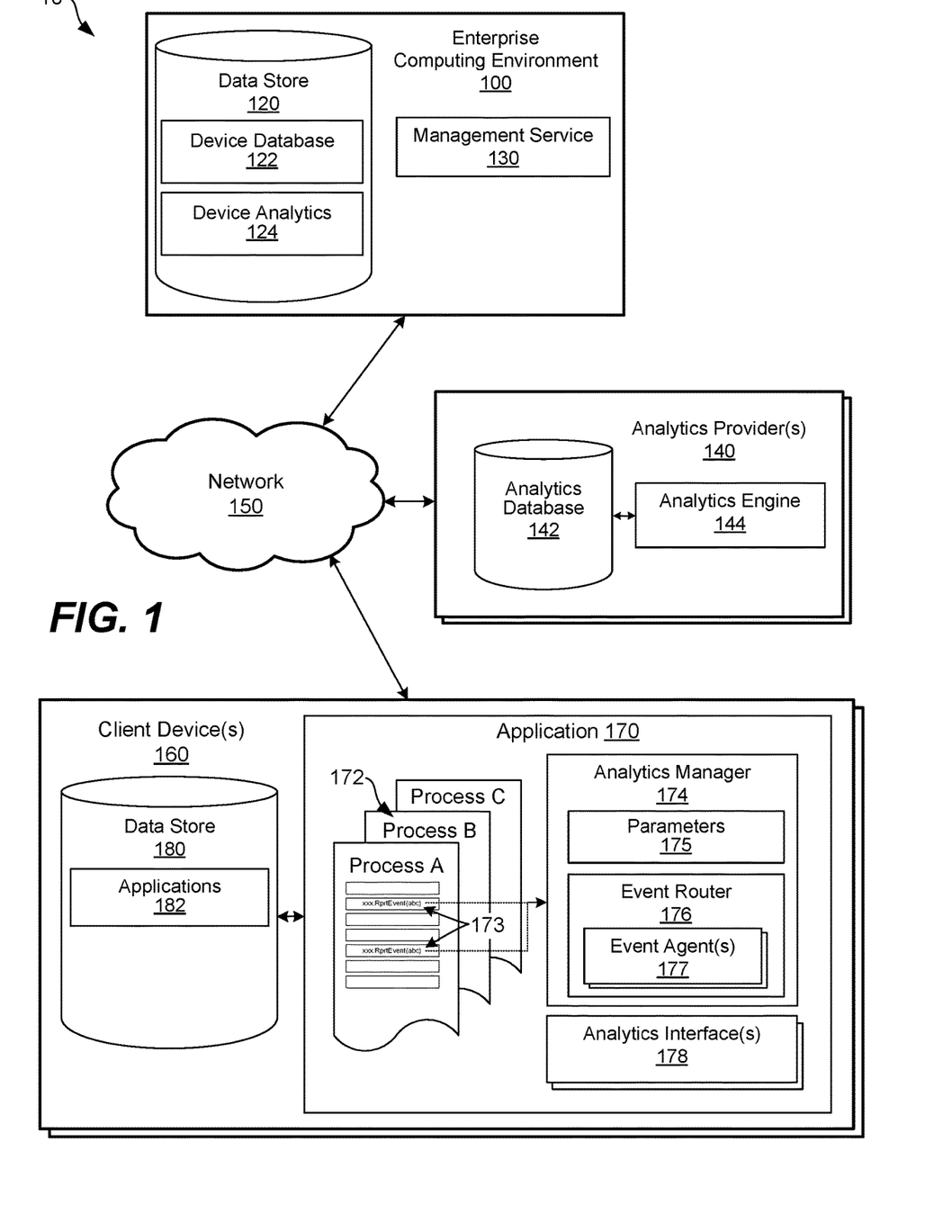
FIG. 1 illustrates an example networked environment for flexible analytics framework selection according to various examples described herein.

Turning to the drawings, the following paragraphs provide an outline of a networked environment followed by a discussion of the operation of the same. FIG. 1 illustrates an example networked environment 10 for flexible analytics framework selection according to various examples described herein. The networked environment 10 includes an enterprise computing environment 100, one or more analytics providers 140, a network 150, and a number of client devices 160. Aspects of flexible analytics framework selection are described below with reference to the enterprise computing environment 100, the analytics providers 140, and the client devices 160, but those components are representative and other networked environments and components can perform the concepts described herein.

The enterprise computing environment 100 can be embodied as one or more computers, computing devices, or computing systems. In certain embodiments, the enterprise computing environment 100 can include one or more computing devices arranged, for example, in one or more server or computer banks. The computing device or devices can be located at a single installation site or distributed among different geographical locations. The enterprise computing environment 100 can include a plurality of computing devices that together embody a hosted computing resource, a grid computing resource, or other distributed computing arrangement. In some cases, the enterprise computing environment 100 can be embodied as an elastic computing resource where an allotted capacity of processing, network, storage, or other computing-related resources varies over time. As further described below, the enterprise computing environment 100 can also be embodied, in part, as certain functional or logical (e.g., computer-readable instruction) elements or modules as described herein.

The enterprise computing environment 100 can function as a device management service for any number of devices, including the client devices 160. The enterprise computing environment 100 includes a data store 120 and a management service 130. The data store 120 includes areas in memory for storage of the device database 122 and the device analytics 124, among other types of data.

The management service 130 can be configured to operate as a mobile device manager for one or more of the client devices 160. During a device management enrollment process, the management service 130 can remotely configure one or more of the client devices 160 for device management. To that end, the management service 130 can coordinate with the operating systems of the client devices 160 (and/or management applications or agents executing on the client devices 160) to register and configure the client devices 160 for device management.

The management service 130 can install and uninstall certain software components on the client devices 160. The software components can include applications, resources, libraries, drivers, device configurations, and other related components. The management service 130 can also transfer device management data, including management policies, compliance rules, configuration data, and other policies and rules to the client devices 160. During and after this enrollment process, the management service 130 can gather various types of data related to the status, use, and management of the client devices 160. The data can be associated with hardware, software, user, network, and other aspects of the status, use, and management of the client devices 160, including the analytics data described herein. The data can be stored by the management service 130 in the device database 122 and the device analytics 124 for later reference and processing.

As part of the device management enrollment process (and even after enrollment has concluded), the management service 130 can install and uninstall certain software components and applications on the client devices 160. In that context, the management service 130 can install applications on the client devices 160, including the applications on the client device 160, as described below. The management service 130 can also configure operating parameters of the client devices 160, and monitor certain actions taken on the client devices 160. Users of the client devices 160, in turn, can execute the applications on the client devices 160. As one example, the users can enter user credentials, configure certain parameters, and accept certain conditions to enroll the client devices 160 in mobile device management services through the execution of the applications.

The developers of the applications installed by the enterprise computing environment 100 may be interested in various analytics related to the applications. For example, the developers may be interested in the manner in which the users of the client devices 160 use the user interfaces (UIs) of the applications. The developers may also be interested in the length of time required to install and configure the applications, whether or not the users complete enrollment, whether or not various features of the applications are used, and other information. Thus, as described herein, the developers of the applications can integrate application analytics code into the applications, and the analytics data can be collected by one or more of the analytics providers 140, depending upon which is selected. Using applications analytics, the analytics providers 140 can capture information related to various events which occur during execution of the applications on the client devices 160. The enterprise computing environment 100 can, in turn, interface with one or more of the analytics providers 140 to review the analytics data related to the applications installed on the client devices 160. The enterprise computing environment 100 can also store the analytics data in the data store 120 as the device analytics 124. Other operational aspects of the enterprise computing environment 100 and the analytics providers 140 are described in further detail below.

The analytics providers 140 are representative of one or more analytics providers. The analytics providers 140 can be embodied as one or more computers, computing devices, or computing systems similar to the enterprise computing environment 100. The analytics providers 140 can be geographically separated from the enterprise computing environment 100 or, in some cases, reside at the same location as (or be integrated with) the enterprise computing environment 100. The analytics providers 140 can receive, store, and process event data received from the client devices 160 as described herein. As an example, one of the analytics providers 140 shown in FIG. 1 includes an analytics database 142 and an analytics engine 144.

The analytics providers 140 can perform real-time collection, analysis, and visualization of data related to the use of various applications executing on the client devices 160. Among other uses, the application analytics can be relied upon to identify how users of the client devices 160 interface with applications executing on the client devices 160, troubleshoot the application interfaces, and identify where developers should focus further development activities. The application analytics can be relied upon to identify which features of an application are the most and the least commonly used by users. The application analytics can also be used to identify the paths users of the client devices 160 take to navigate through menus or interfaces of the applications and the length of time it takes users to navigate through the menus and complete tasks. The application analytics can also be used to identify interfaces that are troublesome, confusing, or problematic for users of the client devices 160.

Each of the analytics providers 140 can adopt a different approach or construct with respect to the collection of event-related data for application analytics. For example, one of the analytics providers 140 may recognize both discrete events and event flows, while another one of the analytics providers 140 may only recognize discrete events or event flows. Likewise, each of the analytics providers 140 can rely upon a different format of application interface calls for event reporting. The concepts described herein provide a way for applications executing on the client device 160 to report event-related data to any of the analytics providers 140 despite these differences.

The network 150 can include the Internet, intranets, extranets, wide area networks (WANs), local area networks (LANs), wired networks, wireless networks, cable networks, satellite networks, other suitable networks, or any combinations thereof. As one example, the enterprise computing environment 100, the analytics providers 140, and the client devices 160 can be respectively coupled to one or more public or private LANs or WANs and, in turn, to the Internet for communication of data among each other. Although not shown in FIG. 1, the network 150 can also include communicative connections to any number and type of network hosts or devices, such as website servers, file servers, cloud computing resources, databases, data stores, or any other network or computing architectures.

In the networked environment 10, the enterprise computing environment 100, the analytics provider 140, and the client devices 160 can communicate data among each other using one or more network transfer protocols or interconnect frameworks, such as hypertext transfer protocol (HTTP), simple object access protocol (SOAP), representational state transfer (REST), real-time transport protocol (RTP), real-time streaming protocol (RTSP), real time messaging protocol (RTMP), user datagram protocol (UDP), internet protocol (IP), transmission control protocol (TCP), other protocols and interconnect frameworks, and combinations thereof.

The client devices 160 are representative of one or more client devices. The client devices 160 can be embodied as any computing devices, processing circuits, or processor based devices or systems, including those in the form of desktop computers, laptop computers, tablet computers, personal digital assistants, cellular telephones, or wearable computing devices, among other example computing devices and systems. Depending upon its primary purpose or function, for example, the client devices 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 160.

As illustrated in FIG. 1, one client device 160 includes the application 170, among others executing on the client device 160, and a data store 180. The application 170 includes one or more processes 172, an analytics manager 174 that implements an analytics framework for the application 170, and one or more analytics interfaces 178. The analytics manager 174 includes one or more parameters 175 to direct the operation of the analytics manager 174, an event router 176, and a number of event agents 177. Among other data, the data store 180 includes memory areas for the storage of applications 182, including the application 170. The application 170 can be developed for the particular purpose of mobile device management of the client device 160 by the enterprise computing environment 100. The concepts of analytics framework selection are built into the application 170 as described below, and the concepts can be built into other applications in a similar manner. Beyond the application 170, other example applications that can be stored in the applications 182 include hypertext-based network browsers, such as the Internet Explorer®, Firefox®, Chrome®, Safari®, or Silk® browsers, e-mail clients, messaging clients, document editors or viewers, file browsers, and other applications for other purposes.

The application 170 is an example software program on the client device 160. The application 170 can be installed on the client device 160 at the direction of the enterprise computing environment 100. In other cases, the application 170 can be installed on the client device 160 at the direction of a user of the client device 160. As an example, the application 170 can be executed on the client device 160 to enroll the client device 160 in the mobile device management services administered by the enterprise computing environment 100. Thus, many of the examples described herein are provided in the context of mobile device management. However, the concepts of analytics framework selection, as described herein, are not limited to use with applications related to mobile device management. Instead, the concepts can be applied to any application to offer a flexible, scalable, provider-independent solution for analytics framework selection and data gathering.

The processes 172 of the application 170 can include the main body of executable code in the application 170. The application 170 includes an analytics framework for gathering analytics data related to the execution of the processes 172. The analytics framework is built into the application 170 using the analytics manager 174. The analytics manager 174 can be part of the application 170 itself, as shown in FIG. 1, in one example case. Alternatively, the functions of the analytics manager 174 can be incorporated into the application 170 through a body of pre-written code, classes, procedures, scripts, configuration data, and other elements in a software library stored in the data store 180. When incorporating the functions of the analytics manager 174 using a library, maven control can be relied upon to update the analytics framework, push updates, and even permit the selection of new analytics providers 140 over time without the need to update the application 170.

The analytics manager 174 can implement a generic event reporting instance for use in the processes 172 to report event-related data. The analytics manager 174 can operate according to one or more of the parameters 175. The parameters 175 can include one or more parameters, variables, compile-time constants, runtime constants, or combinations thereof that enable application analytics through the analytics manager 174. The parameters 175 can also identify which one of the analytics providers 140 is selected for application analytics using a provider type constant. Based on the provider type constant, the analytics manager 174 will communicate event-related data to a selected one of the analytics providers 140 during execution of the processes 172. Any of the parameters 175, including the provider type constant, can be easily changed without any need to significantly modify the application 170 or the analytics manager 174. Thus, as described in further detail below, the analytics manager 174 can direct event-related data to one of the analytics providers 140 based on the parameters 175.

Referring to FIG. 1, a number of events 173 can be triggered at certain occasions during execution of the processes 172 of the application 170. Any number of the events 173 can be inserted throughout the processes 172 by the developers of the processes 172, and each of the events 173 can result in the communication of analytics data back to the analytics manager 174. The events 173 are implemented according to a generic event reporting instance defined by the analytics manager 174. Because the events 173 are implemented according to the generic event reporting instance, the code related to the events 173 can be easily inserted throughout the processes 172 by developers even after the processes 172 are developed. The events 173 can also be inserted without any knowledge of which of the analytics providers 140 will be selected for gathering applications analytics.

Figure 2:
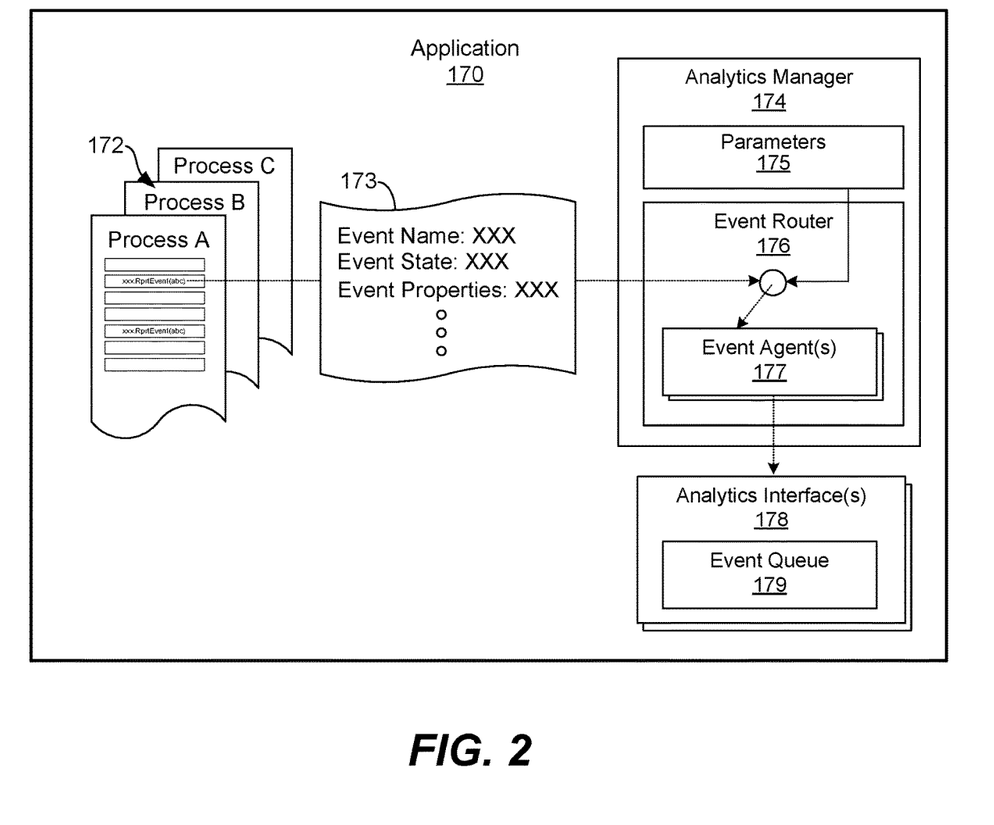
FIG. 2 illustrates an example application on a client device in the networked environment shown in FIG. 1 according to various examples described herein.

FIG. 2 illustrates the application 170 on the client device 160 and further illustrates one of the events 173. Among other types, the events 173 can be related to either an event state or an event flow for analytics data reporting. When called in the processes 172, each of the events 173 is associated with an event name and passes event-related data back to the analytics manager 174.

The event-related data can define an event state and certain event properties associated with the event. The event state data can define begin, end, cancel, and fail state values, among others, for the event 173. Among other data, the event properties can include event instance properties and event run-time information. The run-time information can include data related to the operating characteristics of the client device 160 or the processes 172, such as data associated with the model of the client device 160, the operating system (OS) and OS version information on the client device 160, and the version of the application 170. The run-time information can also include user identification information, timestamp information, memory usage information, and other data related to the client device 160 and the application 170. The event-related data passed from the processes 172 to the analytics manager 174 through the event 173 can be relied upon by the developers of the application 170 to identify how users experience and interface with the application 170. The data can also be used to troubleshoot UIs of the application 170 and identify where the developers should focus ongoing development activities. Event-related data can be collected from similar applications executing on other client devices 160, and the data can be aggregated together to help visualize user trends over time.

When one of the events 173 is triggered during execution of the processes 172, the analytics manager 174 is provided with the event name, event state, and event properties of the event. The analytics manager 174 can review and format the event-related data, as necessary, before forwarding the event-related data to the event router 176. The event router 176 is configured to reference the provider type constant in the parameters 175 to identify which of the analytics providers 140 is being used for application analytics reporting. The event router 176 can then route or forward the event-related data to one of the event agents 177 based on the provider type constant. As described in further detail below, each of the event agents 177 is configured to interface with one of the analytics interfaces 178, and each of the analytics interfaces 178 is provided for network communications with one of the analytics providers 140.

The event agents 177 include a number of different reporting agents, each respectively developed to communicate with one of the analytics interfaces 178. The event agents 177 are configured to report analytics data from the application 170 to one of the analytics interfaces 178. Each of the analytics interfaces 178 is designed to operate using a specific format of application programming interface (API) calls for event reporting. Thus, each of the event agents 177 is also respectively configured to adhere to the API call format of one of the analytics interfaces 178. In the application 170, event-related data is communicated through API calls from one of the event agents 177 to a selected one of the analytics interfaces 178. The selected analytics interface 178 can, in turn, relay the event-related data to an associated one of the analytics providers 140.

Each of the analytics interfaces 178 can be embodied as an interface to one of the analytics providers 140. The analytics interfaces 178 can be configured to communicate analytics data from the application 170 to one of the analytics providers 140 over the network 150. Each of the analytics interfaces 178 can queue up and store event-related data from a number of events over time before communicating the event-related data to an associated one of the analytics providers 140. In that context, one of the analytics interfaces 178 in FIG. 2 is shown to include an event queue 179. Any amount of event-related data received from one of the event agents 177 can be stored and held in the event queue 179 before being communicated to one of the analytics providers 140.

In operation, one of the analytics providers 140 is selected according to a provider type constant defined in the parameters 175 of the analytics manager 174. That selection leads to the event router 176 routing event-related data to one of the event agents 177. In turn, the selected event agent 177 communicates the event-related data to an associated one of the analytics interfaces 178 using one or more API calls. The number, type, and format of the API calls can vary depending upon the event state of the event, among other factors, and various examples are described below with reference to FIGS. 3 and 4. The analytics interface 178 can queue up and store the event-related, as it is received through the API calls, and communicate the event-related data to an associated one of the analytics providers 140 through the network 150. The schedule at which the analytics interfaces 178 communicate the queued-up event-related data back to the analytics providers 140 can vary among the analytics interfaces 178.

The analytics provider 140 can receive the event-related data, format the data into application analytics data, and store the application analytics data in the analytics database 142. Once stored in the analytics database 142, the analytics data can be made available for access and review by the enterprise computing environment 100. Among other uses, the analytics data can be relied upon to identify how users of the client devices 160 interface with the application 170, troubleshoot the UIs of the application 170, and identify where developers should focus further development activities. The analytics data can be relied upon to identify which features of an application 170 are the most and the least commonly used by users. The analytics data can also be used to identify interfaces that are troublesome, confusing, or problematic for users of the client devices 160.

Figure 3:
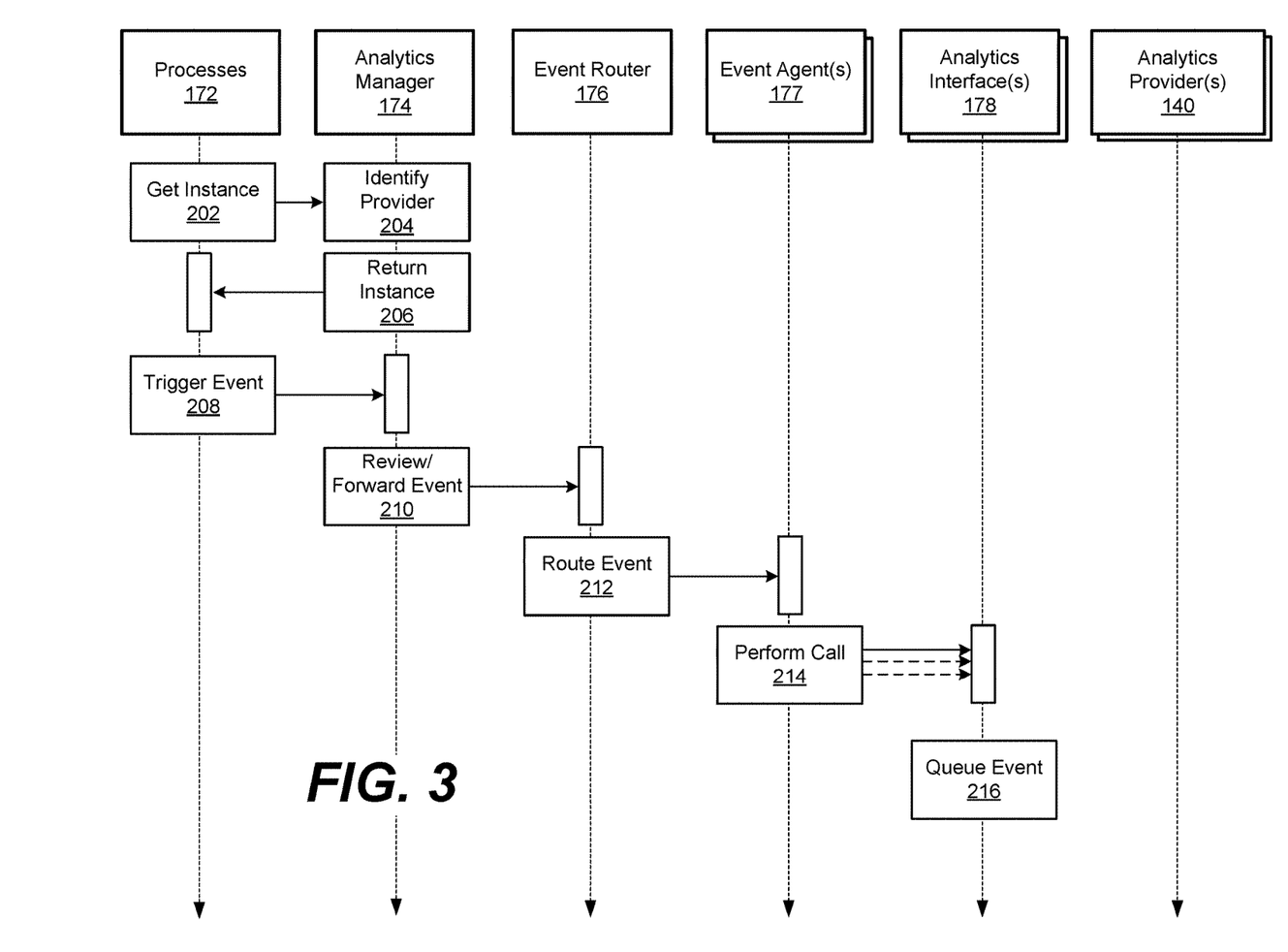
FIG. 3 illustrates an example process for reporting analytics events to a selected analytics provider according to various examples described herein.
Figure 4:
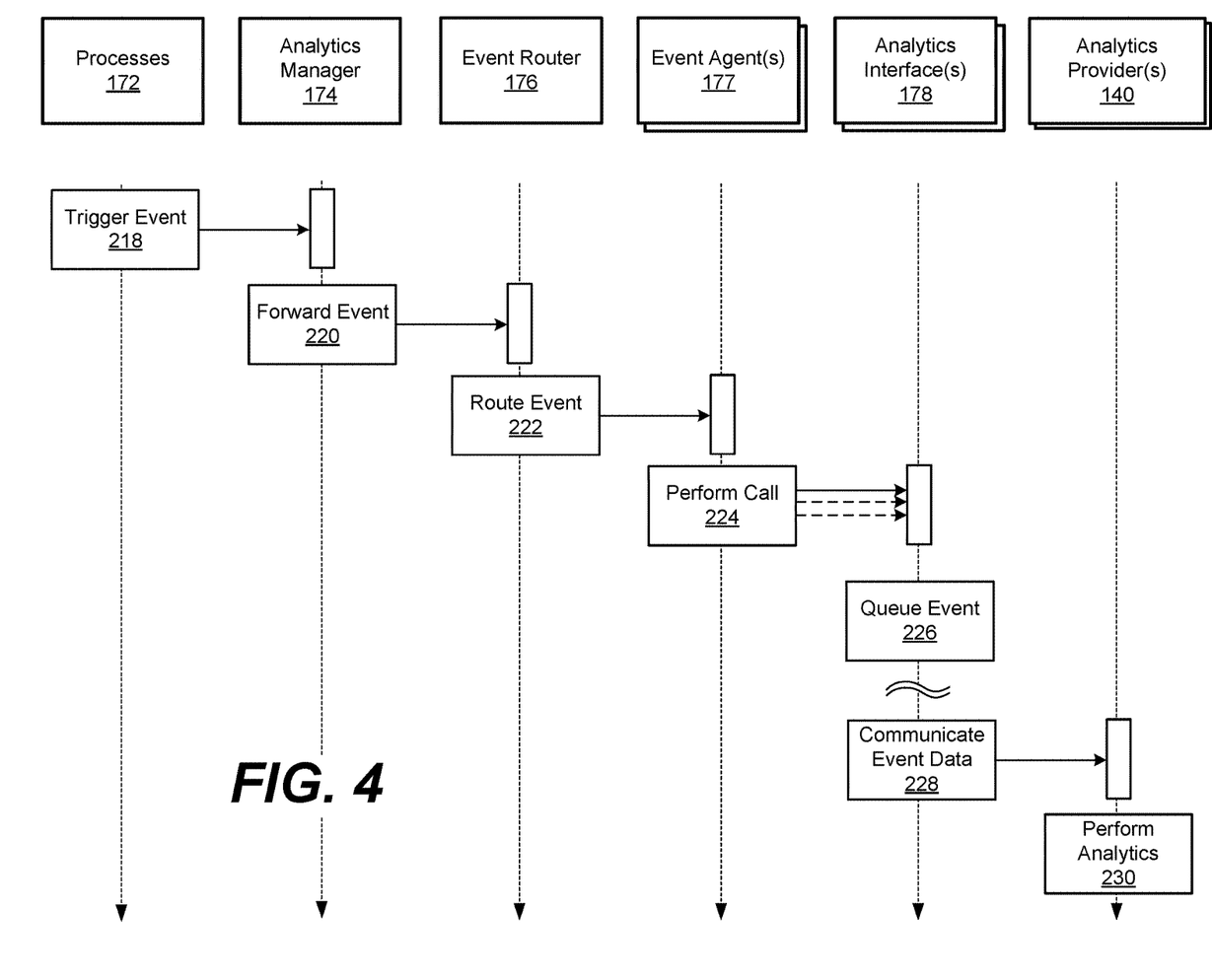
FIG. 4 further illustrates the example process for reporting analytics events to a selected analytics provider according to various examples described herein.

Turning to other examples, FIGS. 3 and 4 illustrate processes for flexible analytics framework selection according to various examples described herein. The processes are described in connection with the components of the networked environment 10 shown in FIG. 1, although other components in other environments can perform the process. Although the process diagrams show an order of operation or execution, the order can differ from that which is shown. For example, the order of execution of two or more process steps can be switched relative to the order shown or as described below. Also, two or more process steps shown in succession can be executed concurrently or with partial concurrence. Further, in some examples, one or more of the process steps shown in the process diagrams can be skipped or omitted.

At the outset in FIG. 2, one or more of the processes 172 of the application 170 are executed on the client device 160. As an example, the processes 172 can be executed on the client device 160 to administer mobile device management services on the client device 160. However, the concepts of analytics framework selection, as described below, are not limited to use with applications related to mobile device management. Instead, the concepts can be applied to other types of applications.

At step 202, the process can include getting an instance for event reporting from the analytics manager 174. For example, the one or more of the processes 172 can request a class instance or class object for event reporting from the analytics manager 174.

At step 204, the process can include the analytics manager 174 identifying one of the analytics providers 140 that is selected for analytics reporting. In some cases, the analytics manager 174 can first identify whether or not analytics reporting is enabled for the application 170 according to the parameters 175. If enabled, the analytics manager 174 can identify one of the analytics providers 140 as being a selected provider according to the provider type constant defined in the parameters 175. In other words, the provider type constant can identify one of the analytics providers 140 shown in FIG. 1.

At step 206, the process can include the analytics manager 174 returning the instance for event reporting. The instance for event reporting can be a generic event reporting instance defined by the analytics manager 174. The generic event reporting instance can be relied upon for event reporting in the processes 172 regardless of which one of the analytics providers 140 is selected for analytics reporting as described herein.

At step 208, the process can include triggering an event in one or more of the processes 172. As described above, any number of events, such as the events 173 shown in FIGS. 1 and 2, can be triggered at any suitable point during execution of the processes 172. A number of different state and flow events, among others, can be positioned to trigger throughout the processes 172. The event at step 208 can result in the communication of event-related data back to the analytics manager 174 as shown in FIG. 3. The event-related data can include an event name, along with event state values and event instance properties. The state values can include event begin, event end, event cancel, and event fail state values, among other state values. The event instance properties can include run-time information, such as data related to the operating characteristics of the client device 160 or the processes 172. The operating characteristics data can include data associated with application version information, operating system (OS) version information, user identification information, timestamp information, memory usage information, and other relevant data.

At step 210, the process can include the analytics manager 174 reviewing and formatting the event-related received from the processes 172 at step 208. Among other data, the event-related data can include an event name, along with the event instance properties. In turn, the analytics manager 174 can format the data associated with the event, as necessary, and forward the event-related data to the event router 176.

At step 212, the process can include the event router 176 routing the event-related data to one of the event agents 177 based on the provider type constant defined in the parameters 175. That is, the event router 176 can reference the provider type constant in the parameters 175 to confirm which of the analytics providers 140 has been selected for application analytics reporting. The event router 176 can then forward the event-related data to the selected one of the event agents 177 based on the provider type constant. Forwarding the event-related data to one of the event agents 177 effectively amounts to the selection of one of the analytics providers 140, because each of the event agents 177 is configured to communicate with one of the analytics interfaces 178, and each of the analytics interfaces 178 will communicate event-related data to only one of the analytics providers 140.

At step 214, the process can include the selected event agent 177 performing an event report call for the event triggered at step 208. Particularly, the selected event agent 177 will perform an event report call for the event triggered at step 208 to an associated or "selected" one of the analytics interfaces 178. Any event-related data associated with the event triggered at step 208 will thus be communicated to the selected one of the analytics interfaces 178 at step 214. The report call can be conducted through one or more API calls, for example, or through another suitable applications or inter-process interface. As described above, the selected event agent 177 can be configured to follow or adhere to the API call format of one of the analytics interfaces 178.

The format or structure of the event report call at step 214 can vary based on the type of event that was triggered at step 208. First, if the event triggered at step 208 is a discrete event, the event-related data communicated at step 214 would be different than that communicated if the event triggered at step 208 were a flow event. Additionally, the event-related data communicated at step 214 can differ depending upon whether the discrete or flow event is associated with an event begin, end, cancel, or fail state. The event report call at step 214 can include a single API call to one of the analytics interfaces 178, communicating the name of the associated event and the properties of the event, such as event instance properties and event run-time information. Alternatively, the event report call at step 214 can include a first API call communicating the name of the associated event and a separate, second event report call communicating the properties of the event. As still another example, the event report call at step 214 can include a first API call communicating the name of the associated event, along with a begin state event, a second API call communicating the properties of the event, and a third API call communicating the name of the associated event, along with an end state event. In any case, the format of the event report call at step 214 can depend upon the approach or construct required by the selected one of the analytics interfaces 178.

At step 216, the process can include the selected analytics interface 178 queueing up the event-related data received through the event report call at step 214. The event-related data can be stored in the event queue 179 of the selected analytics interface 178. As noted above, any number of events can be triggered throughout the processes 172, and each of the events 173 can result in the communication of analytics data back to the selected analytics interface 178. The events can be staggered in time depending upon the flow of the processes 172.

FIG. 4 further illustrates the example process for reporting analytics events to a selected analytics provider. Any amount of time can elapse between step 216 in FIG. 3 and step 218 in FIG. 4. At step 218 in FIG. 4, the process can include triggering another event in the processes 172. Similar to step 208 in FIG. 3, the event at step 218 can result in the communication of event-related data to the analytics manager 1743. The event-related data can include an event name, along with event state values and event instance properties. The state values can include event begin, event end, event cancel, and event fail state values, among other state values. The event instance properties can include run-time information, such as data related to the operating characteristics of the client device 160 or the processes 172.

At step 220, the process can include the analytics manager 174 reviewing and formatting the event-related data received at step 216. Among other data, the event-related data can include an event name, along with the event instance properties. In turn, the analytics manager 174 can format the data associated with the event, as necessary, and forward the event-related data to the event router 176.

At step 222, the process can include the event router 176 routing the event-related data to the selected one of the event agents 177 based on the provider type constant defined in the parameters 175. So long as the provider type constant has not been changed (e.g., since step 212 in FIG. 3), the event router 176 can route the event-related data to the same one of the event agents 177 as in FIG. 3. Forwarding the event-related data to one of the event agents 177 at step 220 effectively amounts to the selection of one of the analytics providers 140, because each of the event agents 177 is configured to communicate with one of the analytics interfaces 178.

It is possible, however, that the provider type constant stored in the parameters 175 could have been changed (e.g., since step 212 in FIG. 3). In that case, the event router 176 can route the event-related data to a different one of the event agents 177 than in FIG. 3. Forwarding the event-related data to a different one of the event agents 177 at step 220 effectively amounts to the selection of a different one of the analytics providers 140, because each of the event agents 177 is configured to communicate with one of the analytics interfaces 178 as described herein.

In either case, at step 224, the process includes the selected event agent 177 performing an event report call for the event triggered at step 218. Particularly, the selected event agent 177 will perform an event report call for the event triggered at step 218 to an associated or "selected" one of the analytics interfaces 178. Any event-related data associated with the event triggered at step 218 will thus be communicated to the selected one of the analytics interfaces 178 at step 224. The report call can be conducted through one or more API calls, for example, or through another suitable applications or inter-process interface. As described above, the selected event agent 177 can be configured to follow or adhere to the API call format of one of the analytics interfaces 178.

The format or structure of the event report call at step 224 can vary based on the type of event that was triggered at step 218 and, in some cases, based on the type of event that was triggered at step 208. First, if the event triggered at step 218 is a discrete event, the event-related data communicated at step 224 would be different than that communicated if the event triggered at step 218 were a flow event. Additionally, the event-related data communicated at step 214 can differ depending upon whether the discrete or flow event is associated with an event begin, end, cancel, or fail state. The event report call at step 214 can include a single API call to one of the analytics interfaces 178, communicating the name of the associated event and the properties of the event, such as event instance properties and event run-time information. Alternatively, the event report call at step 214 can include a first API call communicating the name of the associated event and a separate, second event report call communicating the properties of the event. As still another example, the event report call at step 214 can include a first API call communicating the name of the associated event, along with a begin state event, a second API call communicating the properties of the event, and a third API call communicating the name of the associated event, along with an end state event. In some cases, the event report call at step 224 can end or close an event that was opened or started by the event report call at step 214.

At step 226, the process can include the selected analytics interface 178 queueing up the event-related data received through the event report call at step 224. The event-related data can be stored in the event queue 179 of the selected analytics interface 178. As noted above, any number of events can be triggered throughout the processes 172, and each of the events 173 can result in the communication of analytics data back to the selected analytics interface 178. The events can be staggered in time depending upon the flow of the processes 172.

The selected analytics interface 178 can queue up any amount of event-related data over time before communicating it back to an associated one of the analytics providers 140. At step 228, the process includes the selected analytics interface 178 communicating the event-related data back to the associated one of the analytics providers 140 over the network 150. The event-related data can be communicated over the network 150 using any suitable network transfer protocol.

At step 230, the process can include the analytics provider 140 performing analytics processing on the event-related data received at step 228. The analytics provider 140 can perform real-time collection, analysis, and visualization of the event-related data, and store the event-related data in the analytics database 142. The data stored in the analytics database 142 can be referenced by the enterprise computing environment 100 to identify how users of the client device 160 interfaces with the application 170, troubleshoot the application interfaces of the application 170, and identify where developers should focus further development activities. The data stored in the analytics database 142 can also be relied upon to identify which features of the application 170 are the most and the least commonly used by users and make improvements to the application 170.

Steps similar to those shown in FIGS. 3 and 4 can continue over time, with each event 173 being routed to a selected event agent 177 based on the provider type constant defined in the parameters 175. The event-related data gathered through the events 173 can be routed to one or more of the analytics providers 140 over time based on the provider type constant. Using the concepts described herein, the analytics providers 140 can be easily selected for gathering analytics data over time.

The flowcharts in FIGS. 3 and 4 show examples of the functions and operations of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The enterprise computing environment 100 and the analytics providers 140 can each include at least one processing circuit. Such a processing circuit can include, for example, one or more processors and one or more storage or memory devices coupled to a local interface. The local interface can include, for example, a data bus with an accompanying address/control bus or any other suitable bus structure. Similarly, each of the client devices 160 can include at least one processing circuit. Such a processing circuit can include, for example, one or more processors and one or more storage or memory devices coupled to a local interface.

The storage or memory devices can store data or components that are executable by the processors of the processing circuit. For example, the management service 130 and/or other components can be stored in one or more storage devices and be executable by one or more processors in the enterprise computing environment 100. Similarly, the application 170 and other components can be stored in one or more storage devices and be executable by one or more processors in the client devices 160.

The management service 130, the processes 172, the analytics manager 174, the analytics interfaces 178, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, and/or programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 130, the processes 172, the analytics manager 174, the analytics interfaces 178, and other components, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for reporting analytics events to a selected analytics provider, comprising:
running, by at least one computing device, a process in an application;
identifying, by the at least one computing device, an analytics provider selected for analytics reporting based on a predetermined selection in an analytics framework of the application, wherein the predetermined selection in the analytics framework is based on a provider type constant specified in the analytics framework;
generating, by the at least one computing device, a generic reporting instance within the application, the generic reporting instance being compatible with a plurality of analytics providers; and
performing, by the at least one computing device, an event report call for an event during the process using an event agent for the analytics provider, wherein the event agent is selected based on the provider type constant.

2. The method for reporting analytics events of claim 1, wherein the analytics framework comprises a plurality of event agents for event reporting to the plurality of analytics providers.

3. The method for reporting analytics events of claim 1, further comprising:
triggering, by the at least one computing device, the event at an occasion during the process; and
routing, by the at least one computing device, the event to the event agent for the analytics provider based on the predetermined selection of the provider type constant in the analytics framework.

4. The method for reporting analytics events of claim 1, wherein the analytics provider comprises a first analytics provider, and further comprising: changing, by the at least one computing device, from the first analytics provider to a second analytics provider based on updating the provider type constant in the analytics framework.

5. The method for reporting analytics events of claim 1, further comprising selecting, by the at least one computing device, the event agent for the analytics provider from among a plurality of event agents for the analytics reporting based on the predetermined selection of the provider type constant in the analytics framework.

6. The method for reporting analytics events of claim 5, wherein each of the plurality of event agents adheres to a report call framework of one of the plurality of analytics providers.

7. The method for reporting analytics events of claim 1, wherein performing the event report call comprises the event agent conducting, by the at least one computing device, an interface call to an interface for the analytics provider based on a report call framework defined by the analytics provider.

8. The method for reporting analytics events of claim 7, wherein the interface call comprises an at least one of an interface call for a discrete event or an interface call for a flow event.

9. The method for reporting analytics events of claim 7, wherein the interface call comprises at least one of an event begin, an event end, an event cancel, or an event fail state value.

10. A non-transitory computer-readable medium embodying program code for reporting analytics events to a selected analytics provider that, when executed by at least one computing device, directs the at least one computing device to at least:
identify an analytics provider selected for analytics reporting based on a predetermined selection in an analytics framework of an application, wherein the predetermined selection in the analytics framework is based on a provider type constant specified in the analytics framework;
generate a generic reporting instance within the application, the generic reporting instance being compatible with a plurality of analytics providers;
trigger an event at an occasion during a process of the application; and
perform an event report call for the event during the process using an event agent for the analytics provider, wherein the event agent is selected based on the provider type constant.

11. The non-transitory computer-readable medium according to claim 10, wherein the analytics framework comprises a plurality of event agents for event reporting to the plurality of analytics providers.

12. The non-transitory computer-readable medium according to claim 10, wherein the at least one computing device is further directed to at least select the event agent for the analytics provider from among a plurality of event agents for the analytics reporting based on the predetermined selection of the provider type constant in the analytics framework.

13. The non-transitory computer-readable medium according to claim 12, wherein each of the plurality of event agents adheres to a report call framework of one of the plurality of analytics providers.

14. The non-transitory computer-readable medium according to claim 12, wherein the at least one computing device is further directed to at least route the event to the event agent for the analytics provider based on the predetermined selection of the provider type constant in the analytics framework.

15. The non-transitory computer-readable medium according to claim 10, wherein:
the event report call comprises an at least one of an interface call for a discrete event or an interface call for a flow event; and
the event report call comprises at least one of an event begin, an event end, an event cancel, or an event fail state value.

16. At least one computing device for reporting analytics events to a selected analytics provider, comprising:
a memory device configured to store computer-readable instructions thereon; and
at least one processing device configured, through execution of the computer-readable instructions, to direct the at least one computing device to at least:
identify an analytics provider selected for analytics reporting based on a predetermined selection in an analytics framework of an application, wherein the predetermined selection in the analytics framework is based on a provider type constant specified in the analytics framework;
generating, by the at least one computing device, a generic reporting instance within the application, the generic reporting instance being compatible with a plurality of analytics providers;
trigger an event at an occasion during a process of the application; and
perform an event report call for the event during the process using an event agent for the analytics provider, wherein the event agent is selected based on the provider type constant.

17. The at least one computing device according to claim 16, wherein the event agent adheres to a report call framework of one of the plurality of analytics providers.

18. The at least one computing device according to claim 16, wherein the at least one processing device is further directed to at least route the event to the event agent for the analytics provider based on the predetermined selection of the provider type constant in the analytics framework.

19. The at least one computing device according to claim 16, wherein:
the event report call comprises an at least one of an interface call for a discrete event or an interface call for a flow event; and
the event report call comprises at least one of an event begin, an event end, an event cancel, or an event fail state value.

20. The at least one computing device according to claim 16, wherein performing the event report call comprises the at least one computing device being further directed to queue up event related data received from the event report call, wherein the event related data is stored in an event queue associated with an analytics interface.

* * * * *